(12) United States Patent
Schönert

(10) Patent No.: US 12,460,786 B2
(45) Date of Patent: Nov. 4, 2025

(54) HEADLAMP FOR VEHICLES

(71) Applicant: HELLA GMBH & CO. KGAA, Lippstadt (DE)

(72) Inventor: Oliver Schönert, Arnsberg (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 18/804,368

(22) Filed: Aug. 14, 2024

(65) Prior Publication Data
US 2024/0401763 A1  Dec. 5, 2024

Related U.S. Application Data

(63) Continuation of application No. PCT/EP2023/052317, filed on Jan. 31, 2023.

(30) Foreign Application Priority Data

Feb. 17, 2022 (DE) .......................... 102022103747.9
Mar. 10, 2022 (DE) .......................... 102022105670.8

(51) Int. Cl.
*B60Q 1/068* (2006.01)
*F21S 41/60* (2018.01)
*F21S 45/47* (2018.01)

(52) U.S. Cl.
CPC .............. *F21S 41/60* (2018.01); *B60Q 1/068* (2013.01); *F21S 45/47* (2018.01); *B60Q 2200/32* (2013.01)

(58) Field of Classification Search
CPC .. B60Q 1/068; B60Q 2200/32; B60Q 1/0683; B60Q 2200/36; F21S 41/60; F21S 45/47;
(Continued)

(56) References Cited

U.S. PATENT DOCUMENTS 4,188,655 A    2/1980  Tallon et al.
4,271,456 A *  6/1981  Dick ................... B60Q 1/0683
                                                    362/528
(Continued)

FOREIGN PATENT DOCUMENTS

DE     3533118 A1    3/1987
DE     3616694 A1   11/1987
(Continued)

*Primary Examiner* — Omar Rojas Cadima
(74) *Attorney, Agent, or Firm* — WARNER NORCROSS + JUDD LLP

(57) ABSTRACT

This invention relates to a headlamp for vehicles, comprising a housing in which a light source and an optical unit are arranged for producing a specified light distribution, wherein the optical unit is arranged so as to be movable via an adjustment device with respect to a horizontal and/or vertical axis, and the adjustment device comprises a threaded screw, which is coupled via a ball joint to the housing or to a support frame fastened to the housing, and a threaded shank of the threaded screw is in threaded engagement about a rotational axis with a receiving part, wherein the receiving part is insertable into a fastening part integrally connected to the optical unit, wherein the receiving part is a locking body with a base element extending perpendicularly to the rotational axis and a plurality of locking and/or fastening means projecting from the base element.

13 Claims, 3 Drawing Sheets

(58) Field of Classification Search
CPC .......... F21S 41/198; F21S 41/19; F21S 41/39; F21S 41/29; F21S 41/675; F21S 43/37; F21V 14/025; F21V 14/045; F21V 14/04; F21V 14/065; F21V 14/06; F21V 14/02; F16C 11/0619; F16C 11/0614; F16C 11/06; F16C 11/106; F16C 11/0657; F16C 11/0623

See application file for complete search history.

(56) References Cited

U.S. PATENT DOCUMENTS

| | | | | |
|---|---|---|---|---|
| 4,574,334 | A | * | 3/1986 | Igura ................. B60Q 1/076 |
| | | | | 362/371 |
| 5,091,830 | A | * | 2/1992 | Suzuki ................. F21S 45/33 |
| | | | | 362/539 |
| 5,258,894 | A | * | 11/1993 | Bivens ................. B60Q 1/0683 |
| | | | | 362/528 |
| 5,673,992 | A | | 10/1997 | Schmitt |
| 5,743,618 | A | | 4/1998 | Fujino et al. |
| 2017/0008443 | A1 | | 1/2017 | Burton |

FOREIGN PATENT DOCUMENTS

| | | |
|---|---|---|
| DE | 10309087 A1 | 9/2004 |
| DE | 10332976 A1 | 4/2005 |
| DE | 102007028988 A1 | 12/2008 |
| EP | 0580496 A1 | 1/1994 |
| EP | 3115621 B1 | 8/2020 |
| FR | 2643027 A1 | 8/1990 |

* cited by examiner

HEADLAMP FOR VEHICLES

CROSS-REFERENCE TO RELATED APPLICATIONS

The present application is a continuation of International Application No. PCT/EP2023/052317, filed Jan. 31, 2023, which claims priority to German Patent Application 10-2022-103-747.9, filed Feb. 17, 2022, and German Patent Application 10-2022-105-670.8, filed Mar. 10, 2022, the disclosures of which are incorporated by reference.

BACKGROUND OF THE INVENTION

This invention relates to a headlamp for vehicles, comprising a housing in which a light source and an optical unit are arranged for producing a specified light distribution, wherein the optical unit is arranged so as to be movable via an adjustment device with respect to a horizontal and/or vertical axis, and the adjustment device comprises a threaded screw, which is coupled via a ball joint to the housing or to a support frame fastened to the housing, and a threaded shank of the threaded screw is in threaded engagement about a rotational axis with a receiving part, wherein the receiving part is insertable into a fastening part integrally connected to the optical unit.

DE 10-2007-028-988 A1 discloses a headlamp for vehicles comprising a housing in which a light source and an optical unit are arranged for producing a specified light distribution. The optical unit is adjustably or variably arranged relative to the housing by means of an adjustment device, so that, where applicable, the light distribution in the assembled position of the headlamp may have a predetermined light/dark boundary. The adjustment device comprises a threaded screw, which is rotatably coupled via a ball joint to the housing or a support frame attached to the housing. On the other hand, the threaded screw is mounted for linear displacement relative to a fastening part of the optical unit, so that it can be ensured that the optical unit can be pivoted about a horizontal or vertical axis relative to the housing. The threaded screw has a threaded shank which is guided in a receiving part, wherein the receiving part can be inserted into the fastening part which is firmly connected to the optical unit. Since the receiving part is integrally connected to the housing and the fastening part is integrally connected to the optical unit, the manufacturing effort is relatively high.

SUMMARY OF THE INVENTION

The task of the present invention is to further develop a headlamp for vehicles with an adjustment device for adjusting an optical unit relative to a housing of the headlamp in a mounting position in such a way that the manufacturing costs are further reduced.

To solve this task, the receiving part is a locking body with a base element extending perpendicularly to the rotational axis and a plurality of locking and/or fastening means projecting from the base element.

According to the invention, the receiving part is configured as a locking body, which is manufactured as a loose element and is connected in a positionally secure manner to a fastening part of the optical unit when the optical unit is mounted on the headlamp housing. The locking body has a base element with a hole for the entry of a threaded screw on one side and locking and/or fastening means projecting from this base side on the other. The locking and/or fastening means are used for the locking connection of the locking body to the fastening part. The base element comprises a limit stop surface that rests against an end face of the fastening part in the assembled position. The locking and/or fastening means are configured in such a way that, in this assembled position, the locking body is connected to the fastening part in a positionally secure manner as well as being without play, and is resistant to oscillation and vibration. Advantageously, assembly can be carried out without tools, wherein in a first step the locking body is fastened to the fastening part in a locking manner and in a second step a threaded screw is inserted into the hole of the locking body.

According to an embodiment of the invention, the locking body has a number of expansion elements as locking and/or fastening means, which project from a rear side of the base element of the locking body. The expansion elements are resiliently connected to the base element so that they can be moved (resiliently) transversely to the swivel axis or transversely to the threaded screw. In the assembled position, the expansion elements rest (resiliently) against an inner wall of the fastening part. As soon as the locking body is in the assembled position, a thread can be cut into the expansion elements by inserting the threaded screw. The threaded screw is then linearly guided in the locking body, forming a threaded engagement, wherein the expansion elements are pressed against the inner wall of the fastening part.

According to a further development of the invention, a resilient locking element as a locking/fastening means projects from a rear side of the base element of the locking body, which in the assembled position is connected in a locking manner to a locking lug projecting from an outer wall of the fastening part. The locking connection between the locking element of the locking body and the locking lug of the fastening part thus enables a determination of locking body in the direction of the axis of the locking body or alternatively the fastening part or alternatively the threaded screw.

According to a further development of the invention, a fastening bar projects from the rear of the base element of the locking body as a locking/fastening means, which fastening bar, in the assembled position, engages in a pocket-shaped accommodation of the fastening part. Advantageously, this provides additional clamping between the locking body and the fastening part, which further increases the vibration resistance.

According to a further development of the invention, the fastening bar can be arranged in the pocket-shaped accommodation in a clamping and/or adhesive manner. Advantageously, this can further increase the deep connection between the locking body and the fastening part.

According to a further development of the invention, the base element of the locking body comprises a bulge running in the plane of the base element, which bulge, in the assembled position, rests against a stopper jaw of the fastening part. In this way, an anti-rotational lock of the locking body on the fastening part can be enabled.

According to a further development of the invention, the fastening part comprises a hollow cylinder section, against the inner wall of which the expansion elements of the locking body rest. Preferably, the inner wall comprises support ribs, so that a guide is provided during assembly of the locking body.

According to a further development of the invention, the inner wall of the hollow cylinder section of the fastening part comprises an increase in diameter in an end area facing away from the base element, so that a protection for the locking body against pull-out can hereby be assured. An undesired pulling out of the locking body from the fastening part is thereby countered.

According to a further development of the invention, the expansion elements respectively run at a circumferential angle of less than 90°, so that at least four expansion elements are provided for each locking body. This ensures that the expansion elements are securely threaded.

BRIEF DESCRIPTION OF THE DRAWING

An embodiment of the invention is elucidated in more detail below with reference to the drawings, in which.

DETAILED DESCRIPTION OF THE CURRENT EMBODIMENTS

Figure 5:
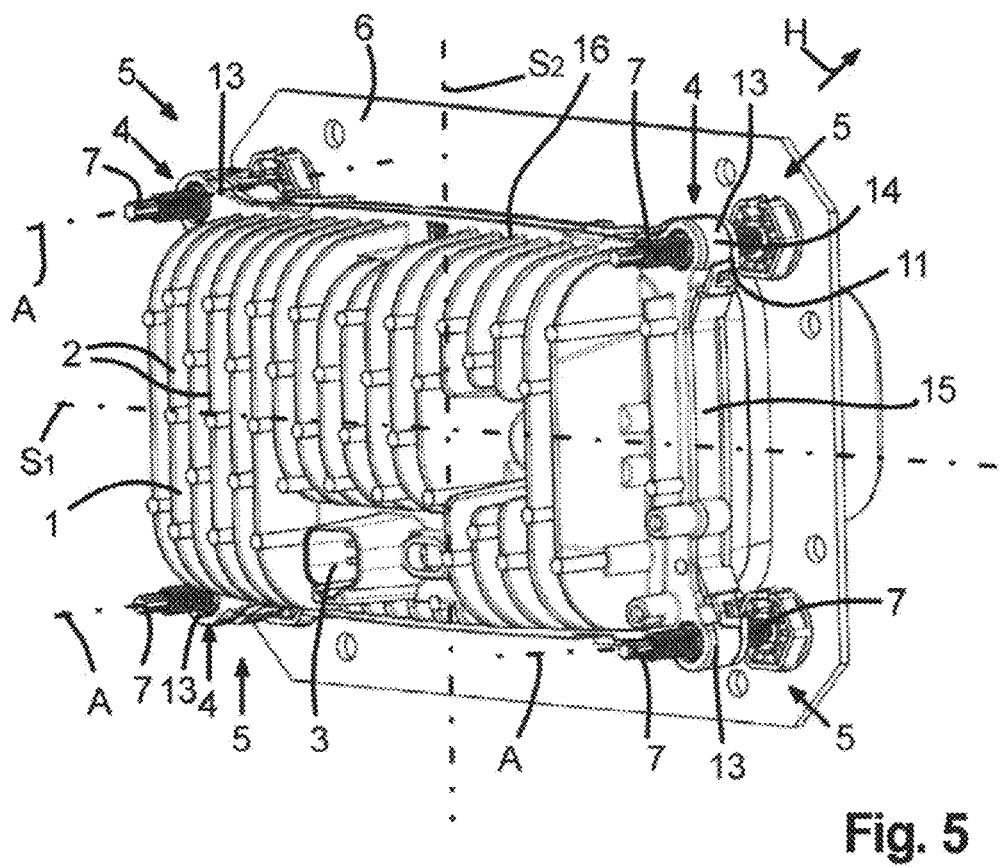
FIG. 5 shows a rear view of the optical unit with a heat sink, wherein the optical unit is connected via the adjusting device in a linearly displaceable manner to a support frame of the headlamp at corner areas thereof.

A headlamp for vehicles comprises a housing in which a light source and an optical unit are arranged for producing a specified light distribution. The headlamp is arranged in a front area of the vehicle. By way of example, the light source and/or the optical unit can be controlled in such a way that a dipped beam distribution or, for example, a fog light distribution is generated. If necessary, a direction indicator light function could also be generated. FIG. 5 shows a rear side of the optical unit, which is formed by a heat sink 1. The heat sink 1 comprises a plurality of cooling fins 2 projecting against a main radiation direction H of the headlamp. The heat sink 1 comprises an opening 3 on the bottom side for inserting the light source. The heat sink 1 is configured as a rectangle and is respectively coupled in a linearly displaceable manner in corner areas 4 via an adjustment device 5 to a support frame 6 that is firmly connected to the housing.

The adjustment device 5 comprises a linear guided threaded screw 7, which is connected to the support frame 6 at one end via the ball joint 8. The ball joint 8 can be formed by a cup accommodation 9 of the support frame 6 and a ball head of the threaded screw 7. The ball head of the threaded screw 7 is usually rotatably mounted in the cup accommodation 9.

The threaded screw 7 comprises a threaded shank 10 which, in the assembled position, is in threaded engagement with a receiving part configured as a locking body 11, wherein the locking body 11 is firmly connected to a fastening part 13 of the optical unit or alternatively heat sink 1 which comprises a hole 12. The threaded screw 7 is rotatably mounted in the locking body 11 about a rotational axis A, which also forms an axis of symmetry of the threaded screw 7, so that, relative to the housing, the optical unit can be swiveled about a horizontal swivel axis $S_1$ and/or vertical swivel axis $S_2$ depending on the actuation of one or a plurality of the threaded screws 7 arranged at the four fastening points.

Figure 1:
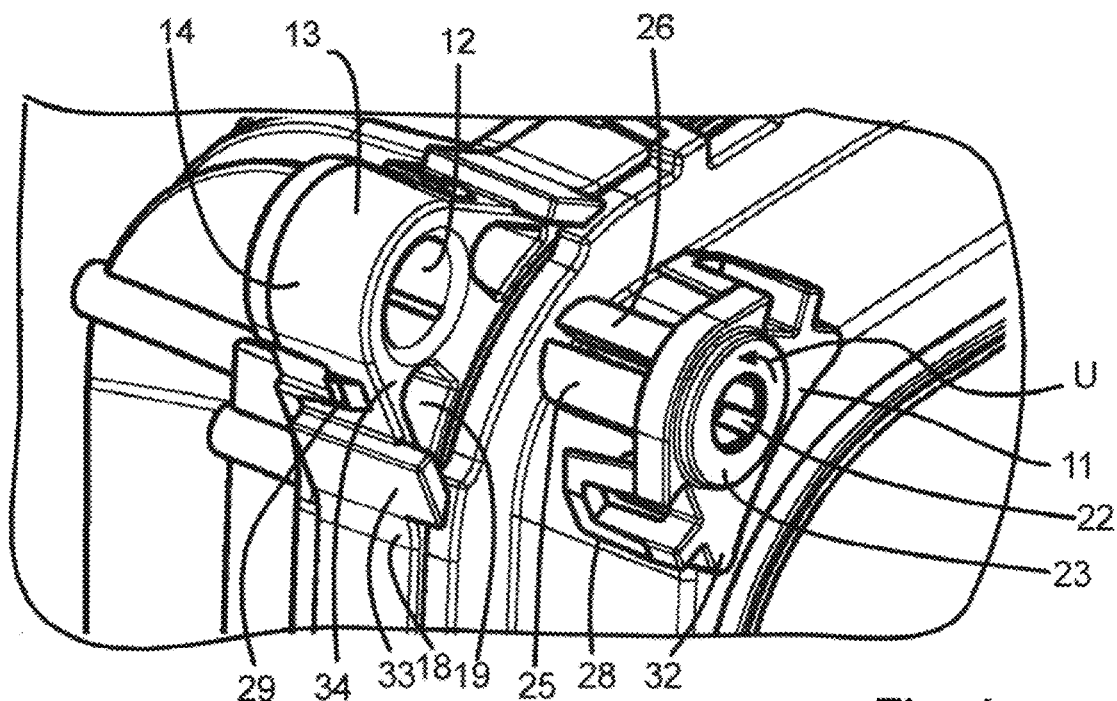
FIG. 1 shows a perspective front view of a locking body of the adjustment device shortly before it is inserted into a hole of a fastening part of an optical unit of the headlamp.
Figure 2:
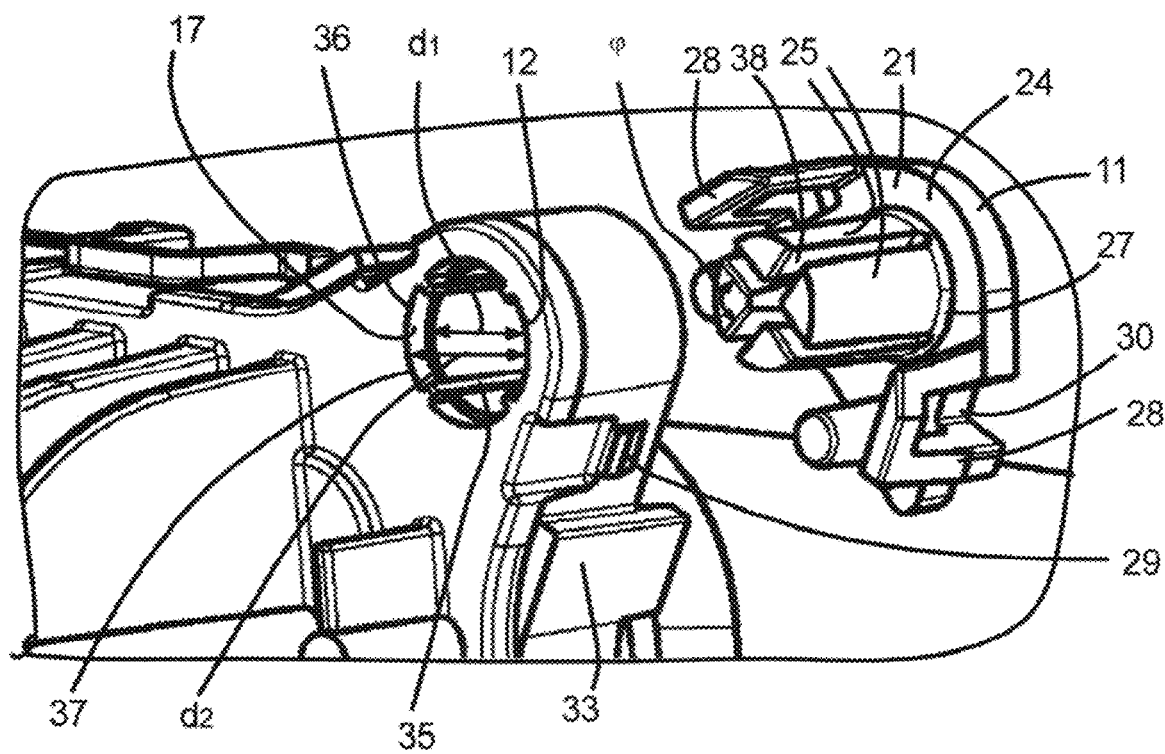
FIG. 2 shows a perspective rear view of the locking body before the same is inserted into the hole of the fastening part as shown in FIG. 1.
Figure 3:
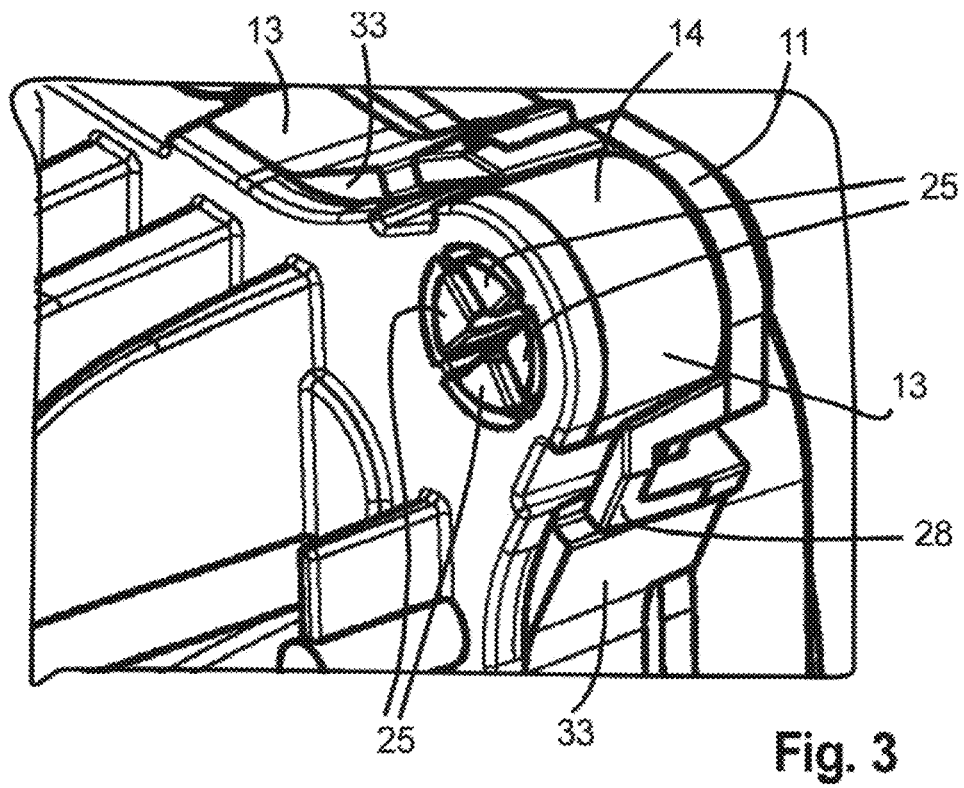
FIG. 3 shows a perspective rear view in the assembled position of the locking body, in which it is fixed to the fastening part.

As can be seen more clearly from FIG. 1 and FIG. 2, the fastening part 13 is arranged in the corner areas 4 of the heat sink 1, wherein the fastening part 13 is arranged in a projecting manner with an arcuate outer wall 14, which wall extends from a vertical edge 15 of the heat sink 1 to a horizontal edge 16 of the heat sink 1 extending at right angles to the same. The outer wall 14 hereby sweeps over a reflex angle. The hole 12 is arranged in the curve of the outer wall 14 with a hollow cylindrical-shaped inner wall 17. A pocket-shaped accommodation 19 is arranged between a bottom 18 of the outer wall 14 and the hole 12 for inserting a fastening bar 20 of the locking body 11.

The locking body 11 comprises a base element 21. From a front side 23 of the base element 21, the threaded screw 7 is inserted into the locking body 11 or alternatively into the through hole 22 of the same. A plurality of locking and/or fastening means project from a rear side 24 of the base element 23 opposite the front side 23.

On the one hand, a number of expansion elements 25 project from the rear side 24 of the base element 21, which expansion elements, in the assembled position, rest against the inner wall 17 of the fastening part 13. In the present embodiment example, four identically shaped expansion elements 25 are provided, each of which extends in the circumferential direction U of the locking body 11 at a circumferential angle φ in a range of less than 90°. The expansion elements 25 are respectively configured like a piece of pie and comprise a circular ring-shaped peripheral surface 26, which comes into contact with the inner wall 17 of the fastening part 13. The expansion elements 25 are respectively integrally connected to the base element 21 exclusively at the rear side 24 of the same base element. The expansion elements 25 are thus configured to be movable or resilient transversely to the rotational axis A. The expansion elements 25 connect directly to an edge 27 of the through hole 22.

At a greater radial distance compared to the expansion elements 25, two opposing resilient locking elements 28 extend from the rear side 24 of the base element 21 as locking and/or fastening means. The resilient locking elements 28 interact with a locking lug 29 arranged on the outer wall 14 of the fastening part 13, so that the locking body 11 fastened to the fastening part 13 is fixed in a locking manner in the direction of the axis A. The resilient locking elements 28 are formed by loops on the outer peripheral edge of the locking body 11, the recess 30 of which engages behind the locking lug 29 in the shape of a barb.

In addition, a number of fastening bars 20 project from the rear side 24 of the base element 21 as locking/fastening means, each of which engages in the pocket-shaped accommodation 19 of the fastening part 13 in the assembled position. In the present embodiment example, the fastening bars 20 are cylindrical and/or curved with a taper towards a free end, wherein, in the assembled position, they are arranged in a clamping manner in the pocket-shaped accommodation 19.

Alternatively or additionally, the fastening bars 20 can also be fixed in the pocket-shaped accommodation 19 of the fastening part 13 by adhesive means.

On the base element 21, the locking body 11 additionally comprises a bulge 32 extending in the plane of the base element 21, which in the assembled position rests against a stopper jaw 33 of the fastening part 13 to form an anti-rotational lock of the locking body 11 relative to the fastening part 13. The stopper jaw 33 of the fastening part 13 extends in an area close to the bottom 18 and is set back somewhat relative to the outer wall 14, so that the bulge 32 of the locking body 11 can strike against the stopper jaw 33.

In addition, the rear side 24 of the base element 21 forms a limit stop for the fastening part 13, wherein the rear side 24 of the base element 21 lies flat against a front face side 34 of the fastening part 13.

In addition, the inner wall 17 of the hole 12 of the fastening part 13 can have support ribs 35 that extend in the axial direction. In this way, the insertion of the expansion elements 25 of the locking body 11 into the hole 12 of the fastening part 13 can be simplified. The support ribs 35 can serve as anti-rotational protection so that the expansion elements 25 do not tear off when the threaded screw 7 is inserted into the through hole 22 of the locking body 11, which is connected to the fastening part 13 in a locking manner. For this purpose, the expansion elements 25 arranged adjacent to each other in the circumferential direction U exhibit a distance to each other in an initial state before engaging in the hole 12 of the fastening part 13 such that radial sides 38 of the adjacent expansion elements 25 facing each other are guided along the axial support rib 35 when the locking body 11 is inserted into the hole 12 of the fastening part 13.

In the area of a rear side 36 of the hole 12 of the fastening part 13, an end area 37 is provided which has a diameter $d_2$ that is larger compared to a diameter $d_1$ of a remaining area of the hole 12. Advantageously, a protection against the pulling out of the locking body 11 is hereby ensured.

In the following, the movement of the locking body 11 in the assembled position to the fastening part 13 is described. In a first step, with the engagement of the expansion elements 25, the locking body 11 is inserted into the hole 12 of the fastening part 13, wherein the fastening bars 31 each engage in the pocket-shaped accommodations and the locking element 28 engages behind the locking lug 29 of the fastening part 13. The locking body 11 is connected in a locationally secure and vibration-free manner to the fastening part 13.

Figure 4:
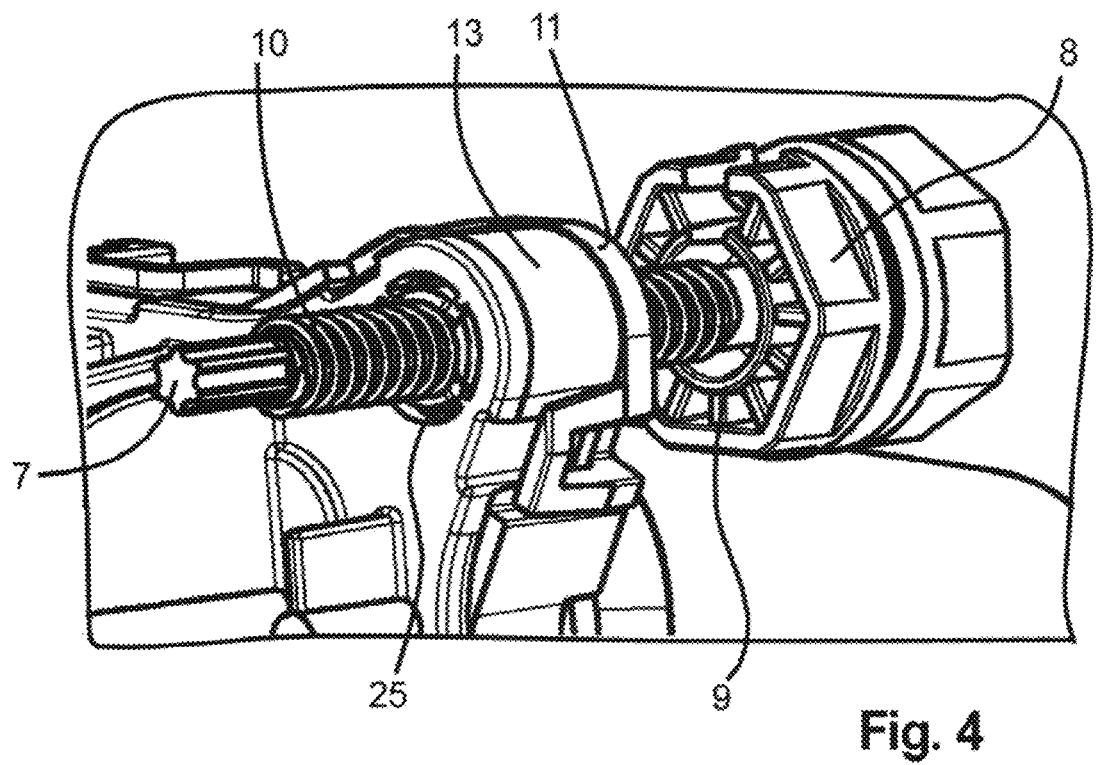
FIG. 4 shows a perspective rear view of the inserted locking body on the fastening part, wherein a threaded screw has been cut into expansion elements of the locking body so that the threaded screw is mounted so as to be linearly displaceable relative to the locking body.

In a further step, the threaded screw 7 is inserted into the through hole 22 of the locking body 11 from the front side of the locking body 11, wherein, during initial insertion, a thread is preferably cut on an inner side of the expansion elements 25. Once the thread has been cut, the expansion elements 25 are respectively configured in the shape of a circular ring cut-out, as can be seen in FIG. 4.

In a further step, the threaded screw 7 is now connected to the support frame 6 via the ball joint 8.

By actuating or alternatively turning the threaded screw 7 at a free end of the same, for example, using a tool, the optical unit or alternatively the heat sink 1 can now be adjusted linearly relative to the support frame 6 at the attachment points.

Preferably, the locking body 11 is made of a plastic material. Like the heat sink 1, the fastening part 13 is preferably made of a metal material. Preferably, the fastening part 13 and the heat sink 1 are made of a metallic die-cast material, for example, as an aluminum die-cast part. The heat sink 1 is preferably integrally connected with the fastening part 13. The threaded screw 7 can be made of a plastic material.

LIST OF REFERENCE NUMERALS 1 heat sink
2 cooling fin
3 opening
4 corner area
5 adjustment device
6 support frame
7 threaded screw
8 ball joint
9 cup accommodation
10 threaded shank
11 locking body
12 hole
13 fastening part
14 outer wall
15 vertical edge
16 horizontal wall
17 inner wall
18 bottom
19 pocket-shaped accommodation
20 fastening bar
21 base element
22 through hole
23 front side
24 rear side
25 expansion element
26 peripheral surface
27 edge
28 locking element
29 locking lug
30 outer wall
31 fastening bars
32 bulge
33 stopper jaw
34 front face surface
35 support ribs
36 rear side
37 end area
38 radial side
$d_2$ diameter
H main radiation direction
φ circumferential angle
A rotational axis
$S_1$ swivel axis
$S_2$ swivel axis
U circumferential direction The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A headlamp for vehicles, the headlamp comprising:
a housing in which a light source and an optical unit are arranged for producing a specified light distribution,
wherein the optical unit is arranged so as to be movable via an adjustment device with respect to a horizontal axis and/or a vertical axis,
wherein the adjustment device comprises a threaded screw which is coupled via a ball joint to the housing or to a support frame fastened to the housing,
wherein a threaded shank of the threaded screw is in threaded engagement about a rotational axis with a receiving part, wherein the receiving part is insertable into a fastening part integrally connected to the optical unit, wherein the receiving part is a locking body with a base element extending perpendicularly to the rotational axis and a plurality of locking and/or fastening means projecting from the base element, wherein the locking and/or fastening means of the locking body includes a plurality of expansion elements and a resilient locking element, wherein the plurality of expansion elements project from the base element of the locking body, in which the plurality of expansion elements, in an assembled position, bear against an inner wall of the fastening part, and wherein the resilient locking element projects from the base element of the locking body and, in an assembled position, is connected in a locking manner to a locking lug from an outer wall of the fastening part.

2. The headlamp of claim 1, wherein the base element of the locking body comprises a bulge running in a plane of the base element and, in an assembled position, rests against a stopper jaw of the fastening part to form an anti-rotational lock for the locking body.

3. The headlamp of claim 1, wherein the fastening part comprises a hole with an inner wall which comprises axial support ribs.

4. The headlamp of claim 3, wherein the inner wall of the hole, in an end area facing away from the base element, comprises an end section which has a diameter that is larger than a diameter of a further area of the hole facing the base element of the locking body.

5. The headlamp of claim 1, wherein at least one of the plurality of expansion elements is connected exclusively on an end face to the base element of the locking body.

6. The headlamp of claim 1, wherein at least one of the plurality of expansion elements extends in a circumferential angle of the locking body in an angular range of less than 90°.

7. The headlamp of claim 1, wherein a plurality of identically configured expansion elements are arranged offset to one another in a circumferential direction, wherein the plurality of expansion elements are arranged at a distance from one another.

8. The headlamp of claim 1, wherein a peripheral surface of at least one of the plurality of expansion elements is shaped as a circular ring cutout.

9. The headlamp of claim 1, wherein the plurality of expansion elements are configured in such a way that a thread is cut on an inner side of each of the plurality of expansion elements by engaging the threaded screw in a through hole of the locking body in an assembled position.

10. The headlamp of claim 1, wherein each of the plurality of expansion elements are arranged adjacent to each other in the circumferential direction and exhibit a distance to each other in an initial state before engaging a hole of the fastening part such that, when the plurality of expansion elements engage the hole, mutually facing radial sides of adjacent expansion elements are guided along axial support ribs of the hole.

11. The headlamp of claim 1, wherein a fastening bar projects from the base element of the locking body as the locking and/or fastening means, which, in an assembled position, engages in a pocket-shaped accommodation of the fastening part.

12. The headlamp of claim 11, wherein the fastening bar is arranged in the pocket-shaped accommodation in a clamping and/or adhesive manner.

13. The headlamp of claim 1, wherein the fastening part is made of a metallic die-cast material.

* * * * *